United States Patent [19]

Sare et al.

[11] 4,059,677
[45] Nov. 22, 1977

[54] CATALYTIC OXIDATION OF $C_2$-$C_4$ HALOGENATED HYDROCARBONS

[75] Inventors: Edward J. Sare, Clinton; Jerome M. Lavanish, Akron, both of Ohio

[73] Assignee: PPG Industries, Inc., Pittsburgh, Pa.

[21] Appl. No.: 753,951

[22] Filed: Dec. 23, 1976

[51] Int. Cl.$^2$ ............................................. B01D 53/34
[52] U.S. Cl. .................................... 423/240; 423/245; 423/481; 423/488
[58] Field of Search ............... 423/240, 241, 245, 481, 423/488; 55/70, 71

[56] References Cited

U.S. PATENT DOCUMENTS

| 3,845,191 | 10/1974 | Bruce, Jr. | 423/240 |
| 3,933,980 | 1/1976 | Smalheiser | 423/245 |
| 3,972,979 | 8/1976 | Kageyama | 423/240 |

Primary Examiner—Earl C. Thomas

Attorney, Agent, or Firm—Irwin M. Stein

[57] ABSTRACT $C_2$-$C_4$ halogenated, e.g., chlorinated and brominated, hydrocarbons, such as vinyl chloride, present in a gas stream are removed therefrom, e.g., incinerated, by contacting the gas stream with an oxygen-containing gas in the presence of metal oxide catalyst system consisting essentially of the oxides of manganese and cobalt at relatively low temperatures, e.g., 100° C. Commonly, the halogenated hydrocarbon is present in the gas stream to be treated in small amounts, e.g., less than 0.05 weight percent. The temperature of treatment can vary, e.g., from 20° C. to 500° C., and can be adjusted within said range depending on the relative humidity of the gas stream treated to maintain catalytic activity. Preferably, treatment occurs under conditions of low relative humidity, e.g., less than 5 percent, and the metal oxides of the catalyst system are hydrated.

23 Claims, No Drawings

CATALYTIC OXIDATION OF $C_2$-$C_4$ HALOGENATED HYDROCARBONS

DESCRIPTION OF THE INVENTION $C_2$-$C_4$ halogenated, e.g., chlorinated and brominated hydrocarbons are used commercially in many applications. For example, vinyl chloride and vinylidene chloride are used to prepare useful polymers and copolymers. Other chlorinated $C_2$-hydrocarbons, such as methyl chloroform (1,1,1-trichloroethane), and trichloroethylene are useful as solvents and are employed in metal degreasing. Ethylene dichloride and ethylene dibromide are used in gasoline as part of lead anti-knock formulations.

Recently, vinylchloride has been reported to be a suspected carcinogen and consequently human exposure levels have been severely restricted. In areas where vinyl chloride is made or used, e.g., polymerized, gas process streams may be produced containing relatively small but still objectionable quantities of vinyl chloride which cannot be recovered economically. Such process streams may include vents connected to process equipment, such as reactor stripper, condenser and drier vents, storage vessel vents, and area vents, e.g., reactor building vents. Thus, a need exists for a method for destroying or reducing significantly the vinyl chloride content of such gas streams. A similar need may exist for gas process streams containing other $C_2$, $C_3$ and $C_4$ chlorinated and brominated hydrocarbons.

It vinyl chloride been reported that certain chlorinated hydrocarbons such as methyl chloroform, vinylidene chloride, trichloroethene, tetrachloroethene, and chloroform are susceptible in varying degrees to Hopcalite-catalyzed decomposition with humidified air (about 50 percent relative humidity) at temperatures in excess of 300° C., e.g., 305° C.–415° C. See, for example, the articles "Catalytic Combustion of Atmospheric Contaminants Over Hopcalite" by J. G. Christian et al, Int. J. Air Wat. Poll. Pergamon Press 1965, Vol. 9, pp. 1–10, and "Catalytic Decomposition of Halogenated Hydrocarbons over Hopcalite Catalyst" by J. K. Musick et al, Ind. Eng. Chem., Prod. Res. Develop., Vol. 13, No. 3, 1974, pp. 175–179.

It has now been discovered that the $C_2$-$C_4$ halogenated, e.g., chlorinated and brominated, hydrocarbon, e.g., $C_2$-chlorinated and brominated hydrocarbon, content of gas streams, e.g., air steams, containing same, can be reduced substantially by contacting such halogenated hydrocarbon with oxygen-containing gas in the presence of metal oxide catalyst system consisting essentially of the oxides of manganese and cobalt at temperatures of from 20° C. to 500° C., e.g., 80°–100° C. Temperatures in the lower portion of the range, e.g., from room temperature, i.e., 20°–23° C. can be effective for short periods of time. Temperatures higher than 100° C., e.g., 100° C.–300° C., are especially useful. More particularly, it has been found that $C_2$-chlorinated hydrocarbons, such as vinyl chloride, vinylidene chloride, methyl chloroform and trichloroethylene, can be removed from gas streams, e.g., air, containing same at relatively mild temperatures in the presence of the aforesaid metal oxide catalyst system wherein the metal oxides of the catalyst system are hydrated and under conditions of low relative humidity, e.g., less than 5 percent (measured at 23° C.). The exact mechanism by which the $C_2$-$C_4$ halogenated hydrocarbon is removed from the gas stream is not known with absolute certainty; but, from the evidence at hand, it is believed that oxidative decomposition (incineration) is a principal mechanism. Other mechanisms, e.g., dehydrochlorination, may also play a part in the removal of such halogenated hydrocarbons from the gas stream.

The temperature at which the process of the present invention is conducted can vary within the aforesaid range of 20° C.–500° C. and, typically will be regulated within said range depending on the relative humidity of the gas streams contacting the catalyst, i.e., the relative humidity of the reaction zone, e.g., incineration zone, to achieve significant catalytic activity. Under incineration conditions of low relative humidity, temperatures on the low side of the aforesaid range, e.g., 20°–110° C. can be used effectively. For example, at a relative humidity of less than 2 percent, e.g., 0.4 percent, the vinyl chloride content of a synthetic air gas stream can be reduced substantially, e.g., from about a 13 ppm level to non-detectable levels (<0.5 ppm), at temperatures of 100°–110° C., e.g., 104° C., when using hydrated manganese/hydrated cobalt oxide catalyst system in a weight ratio of about 1:1 and a synthetic gas flow rate over the catalyst of 44 liters per hour. When the relative humidity of the gas stream is higher than 5 weight percent temperatures higher than 110° C. may be required to maintain catalytic activity under similar conditions. For example, at a relative humidity of about 52 percent, the vinyl chloride content of a synthetic air gas stream can be reduced from 8.5 ppm to non-detectable levels at a temperature of 188° C. under the same flow rate conditions with the same catalyst system.

DETAILED DESCRIPTION $C_2$-$C_4$ halogenated hydrocarbons to which the process of the present invention can be applied are chlorinated and brominated hydrocarbons containing from 2 to 4 carbon atoms and from 1 to 4, preferably 1 to 3, more preferably no more than 2, halogen atoms per molecule. Examples of such halogenated hydrocarbons include: vinyl chloride, vinylidene chloride, methyl chloroform (1,1,1-trichloroethane) 1,1,2-trichloroethane, trichloroethylene, perchloroethylene, vinyl bromide, vinylidene bromide, dichloroethane, ethylene dichloride, ethylene dibromide, propyl chloride, propyl bromide, isopropyl chloride, 1-, 2-, and 3-chloro-propene, 1,2- and 2,3-dichloro-propene, allyl chloride, epichlorohydrin, chloroprene, butylene dichloride, etc. Preferably, the ratio of hydrogen to halogen atoms in the halogenated hydrocarbon is at least one. Preferred are unsaturated $C_2$-halogenated hydrocarbons, i.e., vinyl compounds and incompletely halogenated derivatives of ethylene. The process described herein is deemed particularly applicable to $C_2$-chlorinated hydrocarbons such as vinyl chloride, vinylidene chloride, methyl chloroform, and trichloroethylene.

The metal oxide catalyst system contemplated herein as useful to catalyze the oxidative decomposition of halogenated hydrocarbons, e.g., vinyl chloride, vinylidene chloride, methyl chloroform and trichloroethylene, consists essentially of the oxides of manganese and cobalt. The catalyst system is, therefore, one in which both metal oxides are present.

As the manganese oxide, there is contemplated manganese sesquioxide hydrated [MnO(OH)], manganese dioxide ($MnO_2$), mixed oxides of manganese in which the formal oxidation state of manganese is II and III, and mixtures of such oxides of manganese. Such oxides can also be referred to as manganese (II, III) oxide, e.g., mangano-manganic oxide ($Mn_3O_4$), manganese (III) oxide and manganese (IV) oxide, the roman numeral in parenthesis indicating the formal valence of the metal in the metal oxide. Preferably, the oxide of manganese used is the oxide having the higher oxidation state, i.e., manganese (III) and manganese (IV) oxides. The term "manganese oxide", as used in this specification and claims (unless otherwise indicated), is intended to mean and include any one of the aforementioned manganese oxides or combinations of such manganese oxides.

As the cobalt oxide used in the catalyst system there can be mentioned cobaltous oxide, cobaltic oxide, cobaltic hydroxide and mixtures of such oxides. Such oxides can also be referred to as cobalt (II) oxide (CoO), cobalt (III) oxide ($Co_2O_3$), and cobalt (II, III) oxide ($Co_3O_4$). Preferably cobalt oxide in the higher oxidation state, i.e., cobalt (III) oxide or the mixed oxidation state, i.e., cobalt (II, III) oxide, is used. The term "cobalt oxide", as used in this specification and claims, (unless otherwise indicated) is intended to mean and include any one of the aforementioned oxides or combinations of such oxides.

The weight ratio of manganese oxide to cobalt oxide in the catalyst system can vary broadly. Thus, mixtures of from about 95 parts of manganese oxide and 5 parts of cobalt oxide to 5 parts of manganese oxide and 95 parts of cobalt oxide, basis the total amount of such metal oxides in the catalyst system are expected to be useful. Stated another way, the weight ratio of manganese oxide to cobalt oxide in the catalyst mixture can vary from about 19:1 to 1:19. While less than 5 parts of one of the metal oxides can be used in combination with the other metal oxides, e.g., 1-4 parts, it is not expected that the results obtained with such a catalyst mixture will be significantly different than the results obtained by using only the metal oxide employed as the major component of the oxide mixture. Within the aforesaid range of the weight ratio of manganese oxide to cobalt oxide, there can be mentioned more preferred weight ratios of from 10:1 to 1:10, 5:1 and 1:5, and 2:1 to 1:2, e.g., 1:1.

The catalyst system of the present process is expected to provide improved resistance to loss of catalytic activity due to water vapor and improved retention of catalytic activity over extended periods of use. From the evidence at hand, it appears that long term operational stability of the catalyst system, i.e., maintenance of the catalyst system activity at a particular level, is improved when the manganese oxide content of the catalyst system predominates.

The metal (manganese and cobalt) oxide content of the active portion of the catalyst is typically at least 70 or 75 weight percent, disregarding catalyst supports, preferably at least 80, e.g., 85 weight percent. The remainder of the catalyst can be minor amounts of other metal compounds, e.g., metal oxide impurities that do not interfere significantly with the catalytic function of the catalyst, and water of hydration. Metal oxide impurities can be incorporated during preparation of the catalyst or be present in the reactants used to prepare the catalyst.

It is believed from the evidence at hand that some water of hydration associated with the metal oxides of the catalyst system is beneficial vis a vis, the catalytic activity of the catalyst in the process described herein. For example, it has been observed by Applicants that a manganese dioxide catalyst which had little, if any, water of hydration associated with it was catalytically inactive respecting incineration of vinyl chloride, while a manganese dioxide catalyst having significantly greater amounts of water of hydration associated with it (than the catalyst first mentioned) was catalytically active. That is, the hydrated manganese oxide catalyst catalyzed the oxidative decomposition of vinyl chloride. Further, it has been observed by Applicants that cobalt oxide catalyst which had little water of hydration was catalytically less active respecting the oxidative decomposition of vinyl chloride than a cobalt oxide catalyst having significantly greater amounts of water of hydration. Consequently, it is preferred that at least the manganese oxide be hydrated and most preferred that both the manganese oxide and the cobalt oxide used for the preparation of the catalyst of the present process be hydrated. The presence or absence of water of hydration is related to the temperature seen by the surface of the metal oxide catalyst during its preparation or use. For example, manganese and cobalt oxides prepared by thermal decomposition of their respective salts at temperatures greater than 500° C., e.g., 530° C., can have little water of hydration associated with the resulting oxides and hence would be expected to have little catalytic activity at the lower temperatures utilized in the present process.

The total quantity of water associated with the aforementioned metal oxides as water of hydration can vary depending on the particular mixture of metal oxides used to prepare the catalyst, and, as described, the method of metal oxide preparation. In particular, the drying conditions used in the metal oxide preparation can vary and thereby effect the amount of water of hydration present. It has been found that when the aforementioned metal oxides have an amount of water of hydration at least as high as that obtained by heating an aqueous filter cake of the precipitated metal oxide or metal oxide mixture within the range of 200° C.–225° C. for a time sufficient to reach equilibrium, the metal oxide has an adequate level of water of hydration. Such temperatures, i.e., 200° C.–225° C., e.g., 200° C., are sufficient to remove substantially all of the phase water present in the metal oxide filter cake. Higher drying temperatures can be used; however, care should be exercised at higher temperatures to prevent significant loss of water of hydration and avoid loss of the beneficial effect obtained by its presence.

The effect of the water of hydration on the catalytic activity of the metal oxide catalyst system can be determined best by utilizing the metal oxide catalyst as an incineration catalyst, e.g., a vinyl chloride incineration catalyst, and observing the catalyst's activity as evidenced by reduction of the halogenated hydrocarbon content of the gas stream treated, which is a simple expedient for one skilled in the art. Particularly useful hydrated manganese oxide/cobalt oxide catalyst systems are those which are capable of removing at least 70, e.g., 80, percent of the vinyl chloride present in an air stream containing about 50 ppm vinyl chloride under conditions of less than 1 percent relative humidity (measured at 23° C.), a reactor temperature of 104° C. a gas flow rate over the catalyst of 9 liters per hour, a catalyst bed L/D ratio (depth of catalyst bed/diameter of catalyst bed) of at least 2, and an average residence time in contact with the catalyst of 10 seconds. The average residence time is the value obtained by dividing the volume of catalyst by the volumetric rate of flow through the catalyst. Preferably, at least 90 percent and most preferably substantially all, i.e., non-detectable levels in the gas effluent, of the vinyl chloride is removed from the air stream under such conditions.

Removal of substantially all of the vinyl chloride from an oxygen-containing, e.g., air, gas stream containing same is expected to avoid the formation of chlorinated hydrocarbon by-products, such as 1,1,2-trichloroethane and 1,2-dichloroethylene, at reactor temperatures greater than 150° C. It has been observed that at temperatures of about 190° C. and with significant excess quantities of vinyl chloride in the gas stream treated, i.e., a concentration of vinyl chloride higher than that which can be removed by the catalyst bed under the conditions employed, chlorinated hydrocarbon by-products can be produced. Such by-products are believed to be produced by the reaction of liberated chlorine with the excess vinyl chloride to form 1,1,2-trichloroethane. Subsequent dehydrochlorination of this chlorinated by-product can form 1,2-dichloroethylene and vinylidene chloride.

The metal oxides that make up the catalyst system described herein can be used in an unsupported form or can be supported on an inert substrate. By "inert" is meant that the substrate is chemically inert to the cobalt oxide and manganese oxide catalyst deposited thereon and chemically resistant to the components of the halogenated hydrocarbon-containing gas stream, e.g., vinyl chloride-containing gas stream, and the oxidation products resulting therefrom. Examples of suitable inert substrates include: asbestos, pumice, activated charcoal, silica gel, colloidal silica, fumed silica, activated alumina, and clays. The catalytic activity of the supported metal oxides can vary depending on the method of preparation. For example, a mechanical mixture of metal oxides and the support is commonly more active than a support impregnated with the metal oxides. Heating of the supported catalyst to high temperatures can deactivate the catalyst by sintering the metal oxides, sintering the support to form a mass transfer barrier, or cause reaction between the catalyst and the support. For example, heating cobalt oxide supported on alumina to 850° C. is reported to result in the formation of the catalytically inactive cobalt aluminate ($CoAl_2O_4$). See, "The Oxidation of Hydrocarbons and CO over Metal. III $Co_3O_4$" by Yung-Fang Yu Yao, *Journal of Catalysis*, 33, pp 108–122 (1974). When used in a supported form, the amount of metal oxide placed on the support should be sufficient to catalyze incineration of the $C_2$–$C_4$ halogenated hydrocarbon, i.e., a catalytic amount. The catalytic amount of catalyst and inertness of the support on which the catalyst is placed can be determined easily by one skilled in the art by routine experimentation.

The manganese and cobalt oxides described herein can be prepared in any number of ways well-known to those skilled in the art of catalyst preparation. For example, the metal oxides can be prepared by precipitating the respective metal hydroxides from a solution of the respective metal salt(s). The precipitate is then dried to remove phase water and partially dehydrate the hydroxide and form the oxide. Typically, drying is performed at temperatures of from 100°–225° C., e.g., 100°–200° C. When a catalyst support is used, the metal hydroxides can be precipitated directly onto the support. In addition, the aforementioned metal oxides can be prepared by thermal decomposition of other suitable oxygen-containing anion salts of such metals, e.g., nitrates, carbonates and oxalates. Preferably, thermal decomposition should not be conducted at temperatures which dehydrate completely the metal oxide product. Other methods of metal oxide preparation are described in the Examples contained herein. The surface area of the metal oxides prepared can vary; but, as in most catalyst applications, relatively high surface areas are preferred. The metal oxides can be prepared separately and then combined at some suitable point in the process of their preparation in the ratio desired; or, they can be prepared together, e.g., by precipitating hydroxides of both metals from a combined solution of their respective salts that are compatible and that are present in the proportions desired. The particular method of preparation of the above described metal oxide is not critical to the present process.

In the event the metal oxide catalyst becomes deactivated through use (but not permanently poisoned), it is possible to regenerate the catalyst by passing a dehumidified, i.e., less than 5, preferably less than about 2, e.g., less than 1, percent relative humidity gas stream containing oxygen, e.g., as provided by air, oxygen, or oxygen-enriched air, in intimate contact with the catalyst at elevated temperatures, e.g., about 150° to 200° C., in the substantial absence of contaminating gases, e.g., hydrogen halide (hydrogen chloride), $C_2$–$C_4$ halogenated hydrocarbons (vinyl chloride) and high levels of water vapor. The catalyst is contacted with oxygen for a period of time sufficient to regenerate the catalyst, e.g., from 0.5–10 hours. The exact amount of time will of course be dependent on the amount of catalyst, its level of deactivation, the temperature of treatment, the concentration of oxygen in the gas stream used to regenerate the catalyst, and volumetric rate of flow through the catalyst bed. The totally regenerated catalyst appears from the data at hand to be as efficient as freshly prepared catalyst.

The process described herein results in the removal of $C_2$–$C_4$ halogenated hydrocarbons, e.g., $C_2$-chlorinated hydrocarbons, from a gas stream containing same. The extent to which the aforesaid halogenated compounds are removed from the gas stream is dependent on the conditions of treatment and the particular halogenated compound(s) to be removed. From the evidence at hand, removal appears to be accomplished principally by oxidative decomposition (incineration). Adsorption may play a part in the removal at temperatures significantly below the boiling point of the halogenated hydrocarbon. Dehydrochlorination may also be a mechanism which is occurring in the reaction zone. It is not known for certain at this time to what extent the latter two mechanisms may participate in the removal process. Therefore, the term "incineration", as used in this specification and claims, is intended to mean and include oxidative decomposition alone or in combination with one or both of the other two aforementioned mechanisms.

In accordance with the present process, $C_2$–$C_4$ halogenated hydrocarbons, e.g., chlorinated hydrocarbons such as vinyl chloride, are catalytically oxidized at temperatures between about 20° C. and about 500° C., e.g., 20° C.–300° C. Temperatures less than 300° C., e.g., from 50° C. to 250° C. are particularly suitable. At the lower temperatures, e.g., 20° C.–50° C., catalytic activity falls off rapidly with time; however, in applications such as in gas masks, even a few moments of activity can be important. Temperatures between about 80° C., or 100° C. and about 250° C., e.g., between about 100° C. and 150° C. or 200° C., are deemed to be particularly economically desirable. The use of such fairly moderate temperatures, e.g., temperatures of about 100° C.–115° C., to achieve incineration of the described halogenated hydrocarbons is surprising since significantly higher temperatures are commonly used to incinerate such materials by a non-catalytic process. Consequently, use of moderate incineration temperatures can represent a significant savings in heat energy. Further, an incineration process that operates at about 100° C. can utilize low pressure waste steam which is readily available in chemical process plants; and, therefore, such process offers significant further economic advantages. Temperatures in the range of about 100° C.–150° C. or 200° C., are preferred because such temperatures assist in the removal of the products of oxidation, e.g., hydrogen chloride, carbon dioxide and water, from the surface of the catalyst.

The aforesaid temperatures are reactor temperatures, as described in the Examples following, i.e., the temperature of the gas stream above the catalyst bed. The temperatures of the catalyst surface are believed to be slightly higher than the reactor temperature because of the heat of incineration produced by oxidative decomposition of the halogenated hydrocarbons on the catalyst surface.

The particular incineration temperature selected may depend on the relative humidity of the gas streams entering the reactor containing the catalyst system. Although from the evidence at hand, the present catalyst system appears to be moderately resistant to inhibition by water, water vapor, i.e., the humidity of the gas streams contacting the catalyst does tend to diminish the activity of the mixed metal oxide catalyst. This lowering of activity is more pronounced at relatively low temperatures, e.g., 20° C.–110° C. Therefore, higher temperatures are required to obtain a particular level of catalyst activity with a humidified gas stream than when operating with a substantially dry gas, i.e., a gas stream having low relative humidity.

As used herein, the relative humidity of a gas stream is the value reported as measured at room temperature (23° C.) and ambient pressure (745 millimeters of mercury). By low relative humidity is intended to mean less than about 5, e.g., less than 2, percent.

The activity of the metal oxide catalyst system used in the present process can be expressed in terms of its efficiency at the conditions of incineration, i.e., the percent of $C_2$–$C_4$ halogenated hydrocarbon removed from the gas stream after conditions become constant. The efficiency of the catalyst can be determined by the expression:

$$\frac{(C_i - C_f) \times 100}{C_i}$$

wherein $C_i$ is the initial concentration of the halogenated hydrocarbon in the gas stream and $C_f$ is the final concentration. Thus, the higher the efficiency of the catalyst, the higher is its "activity".

As indicated, the extent of inhibition of the activity of the metal oxide catalyst by water vapor is temperature dependent. The lower the temperature of incineration, the more pronounced the lowering of catalyst system activity. Consequently, for any desired level of catalyst system activity, it is possible to either regulate the relative humidity of the gas stream to be treated or the temperature at which treatment is conducted. Thus, the reactor temperature is maintained at a level within the aforesaid described range to inhibit reduction or loss of the catalyst system's activity by the moisture content of the gas streams contacting the catalyst. The level of catalyst system's activity may vary depending on the halogenated hydrocarbon to be removed from the gas stream, the initial concentration of the halogenated hydrocarbon in the gas stream and the final concentration thereof in the treated stream required by subsequent process treatment, government regulation, etc. It is therefore impossible to set a minimum acceptable level of catalyst system's activity since such a level is determined by the desires and needs of the operator. However, one skilled in the art, with the information provided herein, can select those operating conditions required to provide the catalyst activity desired.

Generally, the higher the incineration temperature and the lower the relative humidity of the entering gas streams, the higher the catalyst system's activity. Therefore, when the amount of heat energy available for incineration or materials of construction limit the incineration temperature to a particular range, the relative humidity of the combined gas stream contacting the catalyst is maintained at a level within said range which will maintain catalyst system's activity at the desired level. On the other hand, if available heat energy or materials of construction do not limit the incineration temperature, the incineration temperature can be adjusted (usually upwards) to offset the adverse effect of moisture on the catalyst system's activity. Thus, within the temperature range of 20° C.–500° C., e.g., 50° C.–300° C., either the temperature of incineration or relative humidity of the treated gas streams or both are regulated or maintained at a level at which the degree of catalyst system's activity reaches the desired magnitude. For example, when the incineration temperature is less than about 110° C. it is expected that the relative humidity will be kept at less than 5 percent, e.g., 2 percent and preferably less than 1 percent.

The above-described effect that water vapor has on the activity of the catalyst system can be described as a reversible poisoning or inhibition to distinguish the effect from an irreversible poisoning, such as the effect of sulfur compounds on noble metal catalysts, reaction of the catalyst surface, etc. In those cases, the effect on the catalyst is not generally reversible without reworking the catalyst. As the data presented in the Examples show, the reduced efficiency of the catalyst due to an increase in the level of water vapor in the gas stream is reversed by lowering the relative humidity of the gas stream to its former level.

In one embodiment of the present process, the gas stream to be treated is dehumidified to a desired relative humidity level and then incinerated at temperatures within the range described hereinbefore. The $C_2$–$C_4$ halogenated hydrocarbon-containing gas stream can be dehumidified, if necessary, by passing it through a drying column containing a desiccant. Either solid or liquid desiccants can be used to remove water vapor from the gas stream. Examples include: silica gel, activated alumina, fused anhydrous calcium sulfate, lime, magnesium perchlorate, calcium chloride, potassium hydroxide, sulfuric acid, lithium chloride solutions and ethylene gylcol. The drying of gases is well-known, for example, in the chemical process industry. Thus, use of solid desiccants in gas masks to take up water vapor is well-known also. The means for achieving such drying is not critical to the practice of the present invention.

The amount of oxygen used in the oxidation of the $C_2$-$C_4$ halogenated hydrocarbons in accordance with the present process should be in an amount that is sufficient to incinerate (oxidize) that quantity of $C_2$-$C_4$ halogenated hydrocarbon contained in the gas stream, i.e., an incinerating (oxidizing) amount, which will reduce the halogenated hydrocarbon content of the gas stream to the desired level. The amount of oxygen should be at least stoichiometrically sufficient to oxidize substantially all of the carbon content of the halogenated hydrocarbon to carbon dioxide and preferably sufficient to oxidize both the carbon content and available hydrogen content of the halogenated hydrocarbon to carbon dioxide and water, respectively. With respect to vinyl chloride, the stoichiometric amount of oxygen is obtained from the following balanced equation:

$$CH_2 = CHCl + 2.5\ O_2 \rightarrow 2CO_2 + H_2O + HCl$$

The calculated heat of reaction for the reaction represented by the reaction of the aforesaid equation is about 270 kilocalories per mole of vinyl chloride.

Generally the amount of oxygen used will be far in excess of the stoichiometric amounts required in order to insure substantially complete oxidative decomposition of the halogenated hydrocarbon compound. The amount of oxygen used is not critical provided that sufficient quantities are made available to accomplish the aforesaid described degree of oxidation. The oxygen can be provided by utilizing air, oxygen, or oxygen-enriched air. The oxygen-containing stream, if separate from the $C_2$-$C_4$ halogenated hydrocarbon-containing stream, can also be dehumidified (in the manner described) to a low relative humidity before being mixed with the aforesaid halogenated hydrocarbon-containing stream.

In carrying out one preferred embodiment of the process of the present invention, the $C_2$-$C_4$ halogenated hydrocarbon-containing gas stream is dehumidified, if necessary, and mixed with dehumidified oxygen-containing gas (is used) and introduced into a preheater. In the event the $C_2$-$C_4$ halogenated hydrocarbon-containing gas stream is sufficiently dry or already contains sufficient quantities of oxygen, no additional drying or mixing with an oxygen-containing stream is required. This may well be the situation in the latter case where an area in which the $C_2$-$C_4$ halogenated hydrocarbon may be present is well ventilated and the exhausted vent gas process stream is to be treated in accordance with the present invention. The dehumidified oxygen-containing process stream that also contains $C_2$-$C_4$ halogenated hydrocarbon is preheated, if necessary, and the heated gas stream introduced into a catalytic reactor in which the metal oxide catalyst system of the present process has been placed, e.g., as a fixed or fluid bed. Preheating should be conducted to the approximate temperature at which incineration is to be conducted, i.e., the reactor temperature. While preheating can be performed before dehumidification, this is not desirable economically.

According to known techniques, the catalyst bed diameter in an integral fixed-bed flow-type catalytic reactor should be at least six times, and bed depth at least 30 times the effective catalyst particle diameter to keep the bed edge and end effect suitably small. The preheated gas stream is maintained in contact with the metal oxide catalyst system for a time sufficient for the incineration reaction to occur. Contact times of from about 1 to 10 seconds at 100° C. and under conditions of low relative humidity have been found to be sufficient. The gas stream exiting from the catalytic reactor(s) is reduced in its $C_2$-$C_4$ halogenated hydrocarbon content. Preferably, the gas stream exiting from the reactor or reactors contains less than 10 ppm, e.g., less than 5 ppm, and, more preferably, less than 1 ppm of $C_2$-$C_4$ halogenated hydrocarbon, and is cooled prior to disposal. It is advantageous to pass the reactor effluent stream through, for example, a caustic scrubber to remove hydrogen halide, e.g., hydrogen chloride or hydrogen bromide which are oxidation or dehydrohalogenation products before disposing of the other innocuous gas products. While only one catalyst bed has been described more than one such bed can be used. For example, multiple separate beds in sequence can be used. Such beds can be in one unit, e.g., stacked beds, or in separate units.

Apparatus in contact with the $C_2$-$C_4$ halogenated hydrocarbon gas stream and incineration products thereof is constructed typically from acid resistant construction materials to minimize corrosion problems. Examples of metallic construction materials include monel, nickel, and stainless steel. Acid resistant engineering plastics, such as Teflon ® (a trademark of E. I. duPont deNemours and Company for polytetrafluoroethylene) and Ryton ® (a trademark of Phillips Petroleum Company for polyphenylene sulfide resins) can be used in the construction of the apparatus as a result of the low temperatures that can be used in the practice of the oxidation process described herein.

The present process is more particularly described in the following Examples which are intended as illustrative only since numerous modifications and variations therein will be apparent to those skilled in the art.

EXAMPLE I

To a solution of 288 grams of distilled water and 400 grams of sulfuric acid in a 1000 milliliter beaker were added 42.5 grams of manganese (II) sulfate monohydrate with stirring. Thereafter, 118.7 grams of potassium permanganate were added to the solution, which was at 65° C. The potassium permanganate was added slowly with vigorous stirring over a period of 40 minutes such that the temperature of the solution was maintained in the range of 64°–66° C. After completion of this addition, the reaction mixture was stirred for a period of 35 minutes. After this period of time, the reaction mixture was poured slowly into approximately 0.75 gallon of distilled water with vigorous stirring to precipitate the manganese dioxide. The precipitated product was then washed and isolated by centrifugation and decantation. About 90 grams of the wet centrifuge cake were then slurried in 200 grams of distilled water.

A solution of 35.25 grams of cobalt (II) sulfate heptahydrate dissolved in 112.5 grams of distilled water was added slowly to a solution of 17.5 grams of anhydrous sodium hydroxide dissolved in 35 grams of distilled water with vigorous stirring. 55 grams of a 35 weight percent aqueous solution of hydrogen peroxide were added slowly in approximately 0.5 ml aliquots to the still viscous, hydrous cobalt oxide suspension with vigorous stirring. After completing the addition of the hydrogen peroxide solution, the reactant mixture was stirred for a period of approximately 15 minutes. The precipitate was then washed thoroughly with distilled water using a centrifuge and isolated by filtration.

About 45 grams of the wet centrifuge filter cake was then slurried in 150 grams of distilled water.

The slurry of hydrous cobalt oxide was then added slowly and with stirring to the aforementioned slurry of manganese dioxide. The combined oxides were then isolated from the resulting combined slurry by filtration and dried overnight in a 50° C. oven. The dried filter cake was then broken up using a mortar and pestle and a minus 8, plus 30 mesh particle size fraction dried at approximately 200° C. for a period of 4 days. The manganese content of the mixed metal oxide was found to be about 78.5 weight percent, as manganese (IV) dioxide ($MnO_2$), by elemental X-ray spectroscopic analysis. The cobalt content of the mixed metal oxide was found to be about 11.9 weight percent, as cobalt (II) oxide (CoO), by the same technique. The calculated weight ratio of manganese oxide to cobalt oxide was accordingly about 6.6:1. Thermogravimetric analysis of a sample of this mixed metal oxide indicated a total weight loss on heating of about 2.5 percent at 200° C. and about 5.6 percent at 400° C.

EXAMPLE II

Nitrogen containing about 39 parts per million of vinyl chloride and about 3 parts per million of vinylidene chloride was mixed with oxygen to produce a stream with the approximate composition of air, i.e., about an 80 volume percent/20 volume percent nitrogen/oxygen gas stream. This synthetic air stream had a dew point of less than $-25°$ C. (relative humidity of less than 2 percent). The small amount of vinyl and vinylidene (hereinafter referred to collectively as vinyl chloride) in the nitrogen was disregarded in calculating the 80/20 volume percent nitrogen/oxygen mixture. Humidification of the synthetic air stream was accomplished by passing a portion of the stream through a simple water bubbler. The degree of humidification was controlled by proportioning the relative amount of the gas stream which passed through the bubbler.

The vinyl chloride containing synthetic air stream was introduced into a preheater, which consisted of a tightly wound coil approximately 2.5 inches in diameter and 2.5 inches in height which was fabricated from 0.25 inch diameter stainless steel tubing. The coil was placed in a 700 watt electric furnace and heated to the temperature desired as the inlet gas stream temperature to the reactor. The preheated synthetic air stream was introduced into the bottom of a vertical catalytic reactor, which was constructed of 0.75 inch diameter 316 stainless steel and which measured approximately 8 inches in length. The catalyst was supported on a 35 mesh stainless steel screen which was located approximately 1.5 inches above the synthetic air stream inlet. A second screen was placed on the top of the catalyst bed to prevent the possible ejection of catalyst particles. Two thermocouples were inserted into the reactor approximately 0.5 inch above and below the catalyst bed to monitor the synthetic air stream temperatures. These thermocouples were positioned such that the junction was located in the center of the reactor. The reactor was insulated with asbestos tape to minimize heat loss and was heated by means of a heating tape. The thermocouple located approximately 0.5 inch above the catalyst bed was utilized as the catalyst bed temperature reference.

The reactor gas effluent was cooled to ambient temperature by means of an approximately 40 inch U-shaped section of 0.25 inch diameter stainless steel tubing. The cooled reactor gas effluent was exhausted to a laboratory hood. At various times during the period in which the vinyl chloride-containing synthetic air stream was introduced into the reactor, samples were taken of the gas stream inlet to the preheater and of the reactor gas stream effluent exiting the cooler in order to assess the vinyl chloride concentration of the gas stream before and after the catalytic reactor, i.e., the catalyst bed. The vinyl chloride/vinylidene chloride concentrations of such gas streams were measured by gas-liquid chromatography utilizing flame ionization detectors. The total gas flow rate to the reactor was measured as was the inlet and outlet temperatures to the reactor.

About 9 grams of the manganese dioxide/cobalt oxide catalyst described in Example I was charged to the reactor as the catalyst bed and tested as a vinyl chloride and vinylidene chloride incineration catalyst. The reactor temperature was maintained at 104° C. The data accumulated is found in Table I.

TABLE I

| Sample No. | Inlet Temp.[a] | Flow Rate[b] | % Rel. Humid.[c] | VCM Concentration[d] | | % Diff.[e] | VDCM Concentration[d] | | Time of Operation[f] |
|---|---|---|---|---|---|---|---|---|---|
| | | | | Inlet | Outlet | | Inlet | Outlet | |
| 1 | 110 | 44 | 0.9 | 38.5 | N.D. | >99 | 3.0 | N.D. | 0.10 |
| 2 | 110 | 44 | 59 (9) | 38.5 | 4.0 | 90 | 3.0 | N.D. | 0.25 |
| 3 | 110 | 44 | 54 (19) | 38.5 | 9.5 | 75 | 3.0 | N.D. | 0.40 |
| 4 | 110 | 44 | 54 (41) | 38.5 | 14.5 | 60 | 3.0 | N.D. | 0.80 |
| 5 | 110 | 44 | 54 (74) | 38.5 | 19 | 50 | 3.0 | (0.3) | 1.35 |
| 6 | 110 | 44 | 54 (92) | 38.5 | 20.0 | 50 | 3.0 | 0.5 | 1.60 |
| 7 | 109[g] | 44 | 1.0 | 38.5 | Trace | >99 | 3.0 | N.D. | 2.35 |

[a]Gas stream temperature at inlet to catalyst bed in ° C.
[b]Total 80/20 $N_2/O_2$ flow rate in liters/hour.
[c]Relative humidity (%) of gas stream at 23° C. Numbers in parentheses refer to the period of time in minutes that the humidified gas stream was used before the sample was obtained.
[d]VCM (vinylchloride) or VDCM (vinylidene chloride) concentration in parts per million (ppm). N.D. denotes not detected. Trace denotes ≦0.2 ppm. All values rounded to 0.5 ppm.
[e]% difference in the VCM concentration of the gas stream.
[f]Approximate total time of operation with respect to VCM and VDCM being present in the gas stream in hours.
[g]Last sample obtained after passing $N_2/O_2$ stream only through catalyst bed for 36 minutes at 104° C. and approximately 0.6% relative humidity.

The data of Table I show that the mixed hydrated manganese oxide/cobalt oxide catalyst of Example I exhibits a high level of catalytic activity at incineration conditions of low relative humidity and at 104° C. with respect to vinyl chloride and vinylidene chloride. Thus, no detectable quantity of vinyl chloride or vinylidene chloride was observed in the exhaust gas from the reactor under these conditions. At high relative humidity, e.g., about 50 percent, the activity of this catalyst decreases relatively rapidly with time with respect to vinyl chloride. However, the catalyst activity with respect to vinylidene chloride remains relatively high at conditions of high relative humidity. The data further indicate that the loss in catalyst activity due to exposure to high relative humidity conditions can be restored. See, for example, sample number 7 in Table I.

Further, the data of aforesaid example demonstrate that the vinyl chloride content of a gas stream containing same can be reduced from the concentration present in the gas stream (~39ppm) to lower levels, e.g., less than 10 ppm, and that the vinylidene chloride content of the gas stream can be reduced to 0.5 ppm or less from a concentration of about 3 ppm.

EXAMPLE III

To a solution of 144.7 grams of distilled water and 201.0 grams of concentrated sulfuric acid in a 1000 milliliter beaker, were added 21.25 grams of manganese (II) sulfate with stirring. After cooling to a temperature of 65° C., 59.9 grams of potassium permanganate was added slowly and with vigorous stirring over a period of twenty minutes, such that the temperature of the solution was maintained in the range of 64°–66° C. After completion of the addition of the potassium permanganate, the reactant mixture was stirred for a period of 18 minutes. The resulting solution was then poured slowly into approximately a ½ gallon of distilled water with vigorous stirring to precipitate manganese dioxide. The precipitated product was isolated by centrifugation and divided into approximately four equal portions. Each of the portions was then washed a total of three times with distilled water by centrifugation and decantation.

A solution of 47.6 grams of anhydrous sodium hydroxide dissolved into 94.0 grams of distilled water was added slowly with vigorous stirring to a solution of 93.0 grams of cobalt (II) sulfate heptahydrate dissolved in 300 grams of distilled water. After completion of the addition, the resulting reactant mixture was stirred for a period of ten minutes. The resulting precipitate was isolated by centrifugation, divided into approximately four equal portions, each of which was washed three times with distilled water by centrifugation and decantation.

EXAMPLE IV

Mixture A

About 131 grams (precipitate plus retained water) of the wet cobalt hydroxide centrifuge cake prepared in Example III was slurried thoroughly in approximately 200 milliliters of distilled water. Twenty five grams of the wet manganese dioxide centrifuge cake prepared in Example III was added slowly with vigorous stirring to the resulting slurry. The combined slurry was then stirred for an additional five minutes. The mixed precipitate was isolated by filtration and the wet filter cake partially dried by compressing the cake between adsorbent paper toweling using a hydraulic press. The filter cake was then placed in an approximately 70° C. oven overnight. The partially dried filter cake was broken up with a mortar and pestle and the minus eight, plus thirty mesh fraction of this product dried at approximately 200° C. for a period of 46 hours. During the final two hours of this drying period, a 26.5 inch mercury vacuum was applied to the product.

Mixture B

Usually essentially the identical procedure described for the preparation of mixture A, a second maganese oxide/cobalt oxide mixture was prepared. For this mixture, approximately 63 grams of the wet cobalt hydroxide centrifuge cake was slurried in approximately 200 milliliters of distilled water and approximately 25 grams of the wet manganese dioxide centrifuge cake was added to this slurry to form the combined slurry.

Mixture C

Using essentially the identical procedure described for the preparation of mixture A, a third manganese oxide/cobalt oxide mixture was prepared. For this mixture, 64 grams of the wet cobalt hydroxide centrifuge cake was slurried in approximately 200 milliliters of distilled water and approximately 50 grams of the wet manganese dioxide centrifuge cake was added to the slurry to form the combined slurry. For this preparation, the total drying period at 70° C. and 200° C. were approximately 44 hours and 5-½ hours respectively. A 26.5 inch mercury vacuum was applied during the last three hours of the 200° C. drying period.

The compositional analyses for the metal oxide mixtures A, B and C are summarized in Table II.

TABLE II

Summary of Compositional Analysis Results

| Mixture | % Metal Oxide[a] | | % Weight Los[b] | |
|---|---|---|---|---|
| | $Co_3O_4$ | $MnO_2$ | 200° C. | 400° C. |
| A[c] | 60.4 | 28.9 | 2.3 | 5.8 |
| B | 45.7 | 42.1 | 1.8 | 4.8 |
| C[d] | 28.0 | 60.7 | 2.3 | 4.6 |

[a]Cobalt and manganese content reported in terms of the weight percent of the indicated oxide.
[b]Total % weight loss at temperature indicated by TGA analysis at a heating rate of 10° C/min.
[c]Comparative values of 59.5% and 28.6% obtained on virgin sample.
[d]Comparative values of 28.2% and 61.0% obtained on virgin sample.

The data of Table II show that metal oxide mixtures A, B, and C appear to have the same relative degree of hydration as all show similar total weight loss characteristics by thermogravimetric (TGA) analysis. The relative proportions of manganese dioxide and cobalt (II, III) oxide in the three mixed oxide preparations vary from approximately 1:2 to 2:1 with mixture B being approximately in a weight proportion of 1:1. X-ray diffraction analyses of the three metal oxide mixtures were shown to exhibit only diffraction patterns characteristic of cobalt (II, III) oxide. These diffraction patterns were relatively weak and diffuse which indicate a primarily amorphous or microcrystalline structure for both the cobalt oxide and manganese dioxide.

EXAMPLE V

Ten grams of manganese oxide/cobalt oxide mixture A of Example IV were charged to the reactor and used as the catalyst bed. The procedure of Example II was used in testing mixture A as an incineration catalyst for $C_2$-chlorinated hydrocarbons except that the nitrogen gas used contained analytically measured 10–50 ppm of vinyl chloride, vinylidene chloride, 1,1,1-trichloroethane (methyl chloroform), trichloroethylene and a small amount (less than 10 ppm) each of 1,1,2-trichloroethane and perchloroethylene. The data accumulated is found in Table III.

TABLE III

| Sample No. | Inlet Temp.[a] | Flow Rate[b] | % Rel. Humidity[c] | VCM Conc.[d] Inlet | VCM Conc.[d] Outlet | VDCM Conc.[d] Inlet | VDCM Conc.[d] Outlet | MC Conc.[d] Inlet | MC Conc.[d] Outlet | Trichlor. Conc.[d] Inlet | Trichlor. Conc.[d] Outlet | TCE Conc.[d] Inlet | TCE Conc.[d] Outlet | Perchlor Conc.[d] Inlet | Perchlor Conc.[d] Outlet | Time of Operation[f] |
|---|---|---|---|---|---|---|---|---|---|---|---|---|---|---|---|---|
| 1 | 119[g] | 44 | 0.4 | 8.5 | N.D. | 10.0 | N.D. | 41.0 | N.D. | 20.5 | N.D. | 2.0 | N.D. | 10.5 | 0.5 | 0.10 |
| 2 | 129[g] | 44 | 0.3 | 8.5 | N.D. | 10.0 | N.D. | 41.0 | N.D. | 20.5 | N.D. | 2.0 | N.D. | 10.5 | 9.0 | 2.60 |
| 3 | 130[g] | 44 | 53 (4) | 6.5 | N.D. | 9.5 | N.D. | 41.0 | N.D. | 20.0 | 4.0 | 1.5 | N.D. | 10.0 | >4.5 | 3.00 |
| 4 | 129[g] | 44 | 57(69) | 6.5 | 0.5 | 9.5 | 1.0 | 41.0 | 0.5 | 20.0 | 15.0 | 1.5 | N.D. | 10.0 | 11.0 | 3.60 |
| 5 | 129[g] | 44 | 57(146) | 9.0 | 2.5 | 9.0 | 4.0 | 40.5 | 1.5 | 19.0 | 17.5 | 2.0 | 0.5 | 10.5 | 11.5 | 5.35 |
| 1 | 185[h,i] | 44 | 0.2 | 9.5 | N.D. | 10.0 | N.D. | 39.5 | N.D. | 23.0 | N.D. | 2.0 | N.D. | 10.5 | N.D. | 0.45 |
| 2 | 184[h] | 44 | 62(127) | 9.5 | N.D. | 10.0 | N.D. | 39.5 | N.D. | 23.0 | N.D. | 2.0 | N.D. | 10.5 | 1.0 | 2.65 |
| 3 | 183[h] | 44 | 64(202) | 9.5 | N.D. | 10.0 | N.D. | 40.5 | N.D. | 23.0 | N.D. | 1.5 | N.D. | 11.0 | 2.5 | 3.90 |
| 4 | 183[h] | 44 | 51(295) | 9.5 | N.D. | 10.0 | N.D. | 40.5 | N.D. | 23.0 | N.D. | 1.5 | N.D. | 11.0 | 3.0 | 5.45 |
| 5 | 183[h] | 44 | 51(326) | 9.5 | N.D. | 10.0 | N.D. | 40.5 | N.D. | 23.0 | N.D. | 1.5 | N.D. | 11.0 | 4.0 | 5.95 |
| 1 | 113[g,j] | 44 | 0.3 | 10.0 | 1.0 | 11.5 | 1.5 | 40.0 | N.D. | 26.0 | 11.5 | 2.0 | 0.5 | 14.5 | 10.5 | 1.20 |
| 2 | 113[g] | 44 | 0.2 | 10.0 | 2.5 | 11.5 | 3.5 | 40.0 | N.D. | 26.0 | 17.0 | 2.0 | 1.0 | 14.5 | 14.5 | 1.70 |

[a-c]See Table I
[d]Concentration in ppm. N.D. denotes Not Detected, <0.4 ppm. All values rounded to ± 0.5 ppm. VCM=vinyl chloride, VDCM=vinylidene chloride, MC=methylchloroform, Trichlor=Trichloroethylene, TCE=1,1,2-trichloroethane, Perchlor=perchloroethylene.
[f]Total time of operation in hours.
[g]104° C. reactor temperature.
[h]188° C. reactor temperature.
[i]Remaining samples obtained after purging reactor with 44 l/hr. 80/20 $N_2/O_2$ gas stream for 10 minutes, heating overnight at 104° C., and pre-heating reactor to 188° C. for 60 minutes.
[j]Remaining samples obtained after purging reactor with 44 l/hr. 80/20 $N_2/O_2$ gas stream for 31 minutes and heating overnight at 104° C.

The initial set of data found in Table III, which was obtained at a reactor temperature of 104° C., shows that this catalyst system exhibited a high level of activity towards all of the chlorinated $C_2$-hydrocarbons studied. A lower level of activity toward perchloroethylene was found. These results show also that the activity of this catalyst system is inhibited at 104° C. at a high, e.g., >50 percent, relative humidity. Thus, approximately 1 hour after increasing the inlet relative humidity level to greater than 50 percent, experimentally significant concentrations of all of the major chlorinated $C_2$-hydrocarbons studied were found in the reactor exhaust.

The second set of data found in Table III, which was obtained at a reactor temperature of 188° C., indicates that, at this higher operating temperature, the relative activity of the catalyst system tested is significantly higher than at 104° C. This is particularly evident in the results obtained at the higher (greater than 50 percent) relative humidity operating condition. Thus, even after 5-½ hours operation, the only significant loss in activity observed was towards perchloroethylene. All of the other chlorinated $C_2$-hydrocarbon components were reduced to non-detectable levels during that period of operation.

The final set of data found in Table III, which was obtained after lowering the reactor temperature to the original 104° C. operating temperature, indicates that operations at elevated temperature, i.e., 188° C., in the presence of $C_2$-chlorinated hydrocarbons of high chlorine content results in some loss in the level of catalytic activity when the reactor temperature is returned to 104° C.

EXAMPLE VI 10.8 grams of manganese oxide/cobalt oxide mixture B of Example IV were charged to the reactor as the catalyst bed and tested as an incineration catalyst for $C_2$-chlorinated hydrocarbons at reactor temperatures of 104° C. and 188° C. The results are tabulated in Table IV.

TABLE IV

| Sample No. | Inlet Temp.[a] | Flow Rate[b] | % Rel. Humidity[c] | VCM Conc.[d] Inlet | VCM Conc.[d] Outlet | VDCM Conc.[d] Inlet | VDCM Conc.[d] Outlet | MC Conc.[d] Inlet | MC Conc.[d] Outlet | Trichlor. Conc.[d] Inlet | Trichlor. Conc.[d] Outlet | TCE Conc.[d] Inlet | TCE Conc.[d] Outlet | Perchlor Conc.[d] Inlet | Perchlor Conc.[d] Outlet | Time of Operation[f] |
|---|---|---|---|---|---|---|---|---|---|---|---|---|---|---|---|---|
| 1 | 107[g] | 44 | 0.4 | 13.0 | N.D. | 9.5 | N.D. | 29.5 | N.D. | 25.5 | N.D. | 2.0 | N.D. | 13.5 | N.D. | 0.20 |
| 2 | 106[g] | 44 | 0.3 | 13.0 | 1.0 | 9.5 | N.D. | 29.5 | N.D. | 25.5 | N.D. | 2.0 | N.D. | 13.5 | N.D. | 1.30 |
| 3 | 105[g] | 44 | 53 (24) | 10.0 | N.D. | 9.5 | N.D. | 29.5 | N.D. | 26.0 | 12.0 | 3.5 | N.D. | 14.5 | 2.5 | 1.80 |
| 4 | 107[g] | 44 | 53 (85) | 10.0 | 0.5 | 9.5 | N.D. | 29.5 | N.D. | 26.0 | 17.5 | 3.5 | N.D. | 14.5 | 13.5 | 2.80 |
| 1 | 171[h,i] | 44 | 0.6 | 9.0 | N.D. | 9.5 | N.D. | 29.5 | N.D. | 25.0 | N.D. | 1.5 | N.D. | 11.0 | N.D. | 0.20 |
| 2 | 171[h] | 44 | 0.5 | 9.0 | N.D. | 9.5 | N.D. | 29.5 | N.D. | 25.0 | N.D. | 1.5 | N.D. | 11.0 | N.D. | 1.25 |
| 3 | 171[h] | 44 | 52 (77) | 8.5 | N.D. | 9.0 | N.D. | 29.0 | N.D. | 25.0 | N.D. | 1.5 | N.D. | 12.5 | N.D. | 3.35 |
| 4 | 171[h] | 44 | 52 (141) | 8.5 | N.D. | 9.0 | N.D. | 29.0 | N.D. | 25.0 | N.D. | 1.5 | N.D. | 12.5 | 0.5 | 4.40 |
| 5 | 169[h] | 44 | 52 (172) | 8.5 | N.D. | 9.0 | N.D. | 29.0 | N.D. | 25.0 | N.D. | 1.5 | N.D. | 12.5 | 1.0 | 4.90 |

[a-c]See Table I
[d,f and h]See Table III
[i]Remaining samples obtained after purging reactor with 44 l/hr. 80/20 $N_2O_2$ gas stream for 27 minutes, heating overnight at 104° C., and pre-heating reactor to 188° C. for 71 minutes.

The data of Table IV show that the catalyst system tested exhibited a level of catalytic activity similar to the catalyst system of Example V, as exhibited in Table III. Thus, the data of Table IV show that the approximately 1:1 weight ratio cobalt oxide/manganese oxide catalyst mixture exhibited a high level of activity under conditions of low relative humidity, e.g., less than one percent, at both the 104° C. operating temperatures. The inhibitory effect of higher levels of water vapor (greater than 50 percent) on catalyst activity was similar to that found in the data found in Table III, i.e., a pronounced effect at 104° C. and a relatively small effect at 188° C.

EXAMPLE VII

Following completion of the studies described in Example V, the higher relative humidity testing was discontinued and a 44 liter/hour purge of 80/20 nitrogen/oxygen was begun. The reactor temperature was maintained at 188° C. After approximately 2 minutes of purging, vinyl chloride was introduced into the synthetic air stream at a level of approximately 320 ppm by bleeding if from a cylinder of nitrogen gas containing an analytically measured 2.5 weight percent vinyl chloride. The flow rate of the synthetic air stream containing vinyl chloride through the reactor was 44 liters per hour. The vinyl chloride content of the synthetic air stream was increased periodically by increasing the used in testing mixture C as an incineration catalyst for $C_2$-chlorinated hydrocarbons at reactor temperatures of 104° C. and 188° C. The data accumulated is tabulated in Table VI.

TABLE VI

| Sample No. | Inlet Temp.[a] | Flow Rate[b] | % Rel. Humidity[c] | VCM Conc.[d] Inlet | VCM Conc.[d] Outlet | VDCM Conc.[d] Inlet | VDCM Conc.[d] Outlet | MC Conc.[d] Inlet | MC Conc.[d] Outlet | Trichlor. Conc.[d] Inlet | Trichlor. Conc.[d] Outlet | TCE Conc.[d] Inlet | TCE Conc.[d] Outlet | Perchlor Conc.[d] Inlet | Perchlor Conc.[d] Outlet | Time Operation[f] |
|---|---|---|---|---|---|---|---|---|---|---|---|---|---|---|---|---|
| 1 | 98[g] | 44 | 0.2 | 7.5 | N.D. | 8.5 | N.D. | 43.0 | N.D. | 16.5 | N.D. | 2.0 | N.D. | 7.0 | N.D. | 0.15 |
| 2 | 97[g] | 44 | 0.2 | 7.5 | N.D. | 8.5 | N.D. | 43.0 | N.D. | 16.5 | N.D. | 2.0 | N.D. | 7.0 | 0.5 | 1.25 |
| 3 | 97[g] | 44 | 52(10) | 7.0 | N.D. | 7.5 | N.D. | 40.0 | N.D. | 15.0 | N.D. | 1.5 | N.D. | 6.5 | 52.0 | 2.10 |
| 4 | 97[g] | 44 | 53(40) | 7.0 | N.D. | 7.5 | N.D. | 40.0 | N.D. | 15.0 | 8.5 | 1.5 | 0.5 | 6.5 | 6.5 | 2.60 |
| 5 | 97[g] | 44 | 57(100) | 7.0 | 1.0 | 7.5 | 0.5 | 40.0 | N.D. | 15.0 | 13.0 | 1.5 | 1.0 | 6.5 | 7.0 | 3.60 |
| 1 | 97[g,h] | 44 | 0.2 | 8.5 | N.D. | 10.0 | N.D. | 42.5 | N.D. | 23.5 | N.D. | 2.5 | N.D. | 11.0 | 0.5 | 0.25 |
| 2 | 183[i] | 44 | 52(8) | 8.0 | N.D. | 9.0 | N.D. | 40.0 | N.D. | 18.5 | N.D. | 1.5 | N.D. | 8.0 | N.D. | 0.20 |
| 3 | 186[i] | 44 | 54(90) | 8.0 | N.D. | 9.0 | N.D. | 40.0 | N.D. | 18.5 | N.D. | 1.5 | N.D. | 8.0 | 0.5 | 1.55 |
| 4 | 186[i] | 44 | 54(120) | 8.0 | N.D. | 9.0 | N.D. | 40.0 | N.D. | 18.5 | N.D. | 1.5 | N.D. | 8.0 | 0.5 | 2.05 |
| 5 | 186[i] | 44 | 52(152) | 8.0 | N.D. | 9.0 | N.D. | 40.0 | N.D. | 18.5 | N.D. | 1.5 | N.D. | 8.0 | N.D. | 2.60 |

[a-c]See Table I
[d,f,g]See Table III
[h]Samples obtained after purging reactor with 44 l/hr. 80/20 $N_2/O_2$ gas stream for 3 minutes, and heating overnight at 104° C. with 9 l/hr. 80/20 $N_2/O_2$ gas stream.
[i]Remaining samples obtained after heating reactor to 188° C. for 77 minutes with 44 l/hr. 80/20 $N_2/O_2$ gas stream.

amount of vinyl chloride-containing nitrogen gas bled into the synthetic air stream. The data accumulated is tabulated in Table V.

TABLE V

| Inlet Temp.[a] | % Rel. Humid.[c] | VCM Conc.[d] Inlet | VCM Conc.[d] Outlet | % Diff.[e] | Time of Operation[f] |
|---|---|---|---|---|---|
| 176 | 0.5 | 320 | N.D. | >99.5 | 0.60 |
| 176 | 0.5 | 370 | N.D. | >99.5 | 0.90 |
| 176[g] | 0.4 | 640 | N.D. | >99.5 | 1.35 |
| 175[h] | 0.4 | 1220 | N.D. | >99.5 | 1.60 |

[a]Gas stream temperature at inlet of catalyst bed in ° C.
[c]Relative humidity (%) at 23° C.
[d]VCM concentration in ppm. N.D. denotes, Not Detected, <0.2 ppm. All values rounded to ± 10 ppm.
[e]% difference in the VCM concentration of the gas stream.
[f]Total time of operation in hours.
[g]Sample obtained 16 minutes after increasing VCM concentration.
[h]Sample obtained 12 minutes after increasing VCM concentration.

The data of Table V demonstrate that the catalyst system tested had a relatively high level of activity towards oxidation of vinyl chloride in air at 188° C. Thus, even at the 1220 ppm level, no detectable concentration (less than 0.2 ppm) of vinyl chloride was found in the exhaust effluent from the reactor. Since the bulk volume of catalyst used in this study was approximately 18 cubic centimeters, the average residence time of the gas in the catalyst bed was approximately 1.5 seconds.

EXAMPLE VIII 10.3 grams of manganese oxide/cobalt oxide mixture C of Example IV were charged to the reactor and used as the catalyst bed. The procedure of Example V was The data of Table VI show that the approximately 1:2 weight ratio of cobalt oxide/manganese dioxide catalyst system exhibits similar activity towards chlorinated $C_2$-hydrocarbons as that of mixtures A and B as exhibited in Tables III and IV. Thus, the catalyst system of this example also shows a relatively high level of catalytic activity towards all components at reactor temperatures of 104° C. and 188° C. under conditions of low relative humidity, e.g., less than 1 percent, and pronounced inhibition of catalytic activity by water vapor at a reactor temperature of 104° C.

EXAMPLE IX

After completion of the studies of Example VIII, as exhibited in Table VI, the total flow rate of synthetic air containing $C_2$-chlorinated hydrocarbons was reduced to 9 liters/hour and the flow of that gas stream continued overnight, i.e., for about 16-½ hours. The reactor temperature was maintained at 188° C. Data obtained at that reactor temperature for flow rates of 9 and 44 liters per hour after this extended period of operation at high relative humidity (>50 percent) are summarized in Table VII (Samples Nos. 1-3). Thereafter, the reactor temperature of the synthetic air stream was lowered to 104° C. and the humidity level of that air stream lowered to less than one percent. Finally, the reactor temperature was lowered to 57° C. The results obtained at these two lower reactor temperatures are also summarized in Table VII.

TABLE VII

| Sample No. | Inlet Temp.[a] | Flow Rate[b] | % Rel. Humidity[c] | VCM Conc.[d] Inlet | VCM Conc.[d] Outlet | VDCM Conc.[d] Inlet | VDCM Conc.[d] Outlet | MC Conc.[d] Inlet | MC Conc.[d] Outlet | Trichlor. Conc.[d] Inlet | Trichlor. Conc.[d] Outlet | TCE Conc.[d] Inlet | TCE Conc.[d] Outlet | Perchlor Conc.[d] Inlet | Perchlor Conc.[d] Outlet | Time of Operation[f] |
|---|---|---|---|---|---|---|---|---|---|---|---|---|---|---|---|---|
| 1 | 186[g,h] | 9 | 63(1155) | 9.0 | N.D. | 9.5 | N.D. | 41.0 | N.D. | 19.0 | N.D. | 1.5 | N.D. | 10.0 | N.D. | 16.40 |
| 1 | 189[g] | 44 | 53(1281) | 9.5 | N.D. | 11.5 | N.D. | 42.5 | N.D. | 23.0 | N.D. | 1.5 | N.D. | 12.0 | 1.5 | 0.95 |
| 2 | 187[g] | 44 | 53(1389) | 9.5 | N.D. | 11.5 | N.D. | 42.5 | N.D. | 23.0 | N.D. | 1.5 | N.D. | 12.0 | 3.0 | 2.75 |
| 1 | 123[i,j] | 44 | 0.6 | 8.5 | N.D. | 10.0 | N.D. | 45.0 | N.D. | 23.5 | 0.5 | 2.0 | N.D. | 11.5 | 1.0 | 0.35 |
| 1 | 63[k,l] | 44 | 0.3 | 9.0 | 2.5 | 9.5 | 5.0 | 43.5 | N.D. | 22.0 | 5.0 | 2.0 | N.D. | 11.0 | 1.0 | 0.50 |
| 2 | 60[k] | 44 | 0.2 | 9.0 | 6.0 | 9.5 | 12.5 | 43.5 | N.D. | 22.0 | 19.5 | 2.0 | N.D. | 11.0 | 7.0 | 1.05 |
| 3 | 59[k] | 44 | 0.2 | 9.0 | 7.5 | 9.0 | 16.5 | 43.5 | N.D. | 22.0 | 23.5 | 2.0 | N.D. | 11.0 | 10.5 | 2.05 |

[a-c]See Table I
[d,f]See Table III
[g]188° C. reactor temperature.
[h]Remaining samples obtained after operating reactor with 9 l/hr, chlorinated $C_2$-hydrocarbon containing, 80/20 $N_2/O_2$ gas stream overnight at 188° C., and relative humidity of 61%.
[i]hu i104° C. reactor temperature.
[j]Sample obtained 22 minutes after decreasing reactor temperature to 104° C. and discontinuing increased relative humidity level.
[k]57° C. reactor temperature.
[l]Remaining samples obtained 30 minutes after decreasing reactor temperature to 57° C.

The first three data entries of Table VII show that the catalytic activity of the 1:2 weight ratio of cobalt oxide/manganese dioxide catalyst system remained at a relatively high level during the extended test period at high relative humidity. Thus, a high level of catalytic activity was maintained toward all of the $C_2$-chlorinated compound tested at the 9 liter per hour flow rate. When the synthetic air flow rate was increased to 44 liters/hour, the high level of activity was maintained toward all of the compounds tested with the exception of perchloroethylene which was found in an experimentally significant amount in the reactor effluent exhaust stream.

The fourth entry in Table VII shows that the level of catalytic activity at 104°0 C. was essentially the same as that observed at 188° C. with the exception that a small but experimentally significant quantity of trichloroethylene was also found in the reactor effluent exhaust. The last three results tabulated in Table VII show a reduced level of catalytic activity at a reactor temperature of 57°0 C. The data show a significantly higher concentration of vinylidene chloride at 57° C., which indicates that dehydrochlorination of methyl chloroform may have occurred.

The above examples demonstrate that a hydrated cobalt oxide/manganese oxide catalyst system exhibits catalytic activity at temperatures of from about 100° C., e.g., 104° C. to about 190° C., e.g, 188° C., under conditions of low and high relative humidity respecting incineration of $C_2$-halogenated, e.g., chlorinated, hydrocarbons such as vinyl chloride, vinylidene chloride, methyl chloroform and trichloroethylene, especially vinyl chloride and vinylidene chloride. Further, the examples demonstrate that the $C_2$-halogenated hydrocarbon content of the gas stream containing same can be reduced from the concentrations present in the gas stream to lower levels, for example, to less than 10 ppm, often less than 0.5 ppm (when the initial concentrations are higher than such reduced level).

The above-described catalyst system will find particular application in reducing $C_2$-chlorinated hydrocarbons, e.g., vinyl chloride and vinylidene chloride, in air streams containing same. Thus, it is contemplated that vent discharges from enclosed work areas in polyvinyl chloride producing facilities, vinyl chloride storage tank facilities, $C_2$-chlorinated hydrocarbon production facilities, etc., can be treated to reduce the concentration of such $C_2$-chlorinated hydrocarbons appreciably by the process of the present invention.

The concentration of $C_2$-$C_4$ halogenated, e.g., chlorinated hydrocarbons in gas streams containing same, e.g., air streams can vary. Commonly, the concentration in air streams will be below or above the explosive range. For example, the concentration of vinyl chloride in air streams is typically maintained below 40 weight percent. It is contemplated therefore that the present process will find application to air streams that contain less than 4 e.g., less than 10 weight percent vinyl chloride. Further, the present process is useful for incineration of vinyl chloride at even low concentration levels, e.g., less than 0.05 weight percent (500 ppm) and even less than 0.01 weight percent (100 ppm). As the Examples illustrate, incineration of $C_2$-chlorinated hydrocarbons, such as vinyl chloride and vinylidene chloride, occurs even at concentrations less than 100 ppm, e.g., 50 ppm. Thus the range of vinyl chloride concentrations can vary from about 0.0005 (5 ppm) to 4 weight percent, e.g., from about 0.001 (10 ppm) to 0.1 (1000 ppm), more usually from 0.001 to 0.05 weight percent. With good ventilation, a range of from 0.001 to 0.01 (100 ppm) weight percent vinyl chloride in the gas stream can be obtained. The aforesaid levels are considered applicable to the other $C_2$-$C_4$ halogenated hydrocarbons described herein or combinations of such halogenated hydrocarbons in gas streams.

In one application of the present invention, it is contemplated that vent gas streams containing $C_2$-$C_4$ halogenated, e.g., chlorinated, hydrocarbons such as vinyl chloride, e.g., vinyl chloride-containing air streams, will be dried to a low relative humidity, i.e., less than 5 percent, preferably less than about 2 percent, by absorption, adsorption, compression, cooling or compression and cooling. A simple and effective means for drying such a gas stream is to pass the gas through a drying column containing a solid or liquid desiccant, examples of which were previously described. The dried gas stream is then preheated to about 100° C. – 200° C. by low pressure waste stream and introduced into a catalyst bed, e.g., fixed or fluid, containing the mixed metal oxide catalyst system of the present invention along with an oxidizing amount of oxygen. The bed can also be heated by the low pressure waste stream. The effluent gas from the reactor can be scrubbed by conventional techniques, e.g., in a caustic scrubber, to remove by-product hydrogen halide, e.g., hydrogen chloride gas, and the innocuous effluent gas from the scrubbing means utilized discharged in an environmentally acceptable manner.

It is also contemplated that the metal oxide catalyst system of the present invention can be used in protective breathing devices for individuals, e.g., a gas mask. The activity of the catalyst system of the present invention at ambient temperature, at least for short periods of time, may provide the time required for an individual to leave safely a contaminated area and reach a safety zone, i.e., a non-contaminated area. It is contemplated that any conventional gas mask can be modified to include an additional layer of the mixed metal oxide of the present invention or such oxide can replace a catalytic material already contained in the gas mask, but not needed for the aforesaid application.

Typically, a gas mask comprises a cannister assembly (cylindrical or rectangular) having side walls, a lower lid and an upper lid at opposite ends of the cannister which are sealed to the cannister assembly by O-rings or other suitable sealing means. The lids contain air inlet and outlet means. Within the cannister are a plurality of spaced, parallel screen assemblies between which are layers of adsorbents and catalysts to remove objectionable vapors from the air passing through the cannister. Typically the first layer with which the incoming air is contacted is an activated charcoal followed by at least one layer of desiccant, e.g., caustic soda fused on pumice stone, fused calcium chloride, etc. Next, there can be placed the mixed metal oxide catalyst system of the present invention for the catalytic oxidation of $C_2$-$C_4$ halogenated hydrocarbon followed by a protective layer of desiccant to protect the oxide against moisture reaching it from above. Typically the individual layers of adsorbents and catalysts are separated by parallel wire screens which often contain filters, e.g., cotton wool filters. The air inlet conduit contains a check valve to allow air to pass in one direction, i.e., inwardly, and a filter to remove suspended solids included in the air intake. The air outlet is connected to a mouthpiece by means of hose means. The mouth piece can also be provided with one way air discharge means for removing exhaled air from the wearer of the mask.

Although the present process has been described with reference to specific details of certain embodiments thereof, it is not intended that such details should be regarded as limitations upon the scope of the invention except as and to the extent that they are included in the accompanying claims.

We claim:

1. A method for treating a $C_2$–$C_4$ halogenated hydrocarbon containing gas stream, said halogenated hydrocarbon being selected from the group consisting of chlorinated and brominated hydrocarbons, which comprises contacting the halogenated hydrocarbon with an oxidizing amount of oxygen-containing gas in the presence of metal oxide catalyst system, the metal oxide catalyst content of which consists essentially of a mixture of hydrated manganese oxide and cobalt oxide, the weight ratio of manganese oxide to cobalt oxide being from 19:1 to 1:19, at temperatures within the range of from 20° C., to 500° C., for a time sufficient to reduce the halogenated hydrocarbon content of the gas stream, said temperature being such as to inhibit water-induced loss of catalyst activity.

2. The method of claim 1 wherein the halogenated hydrocarbon is vinyl chloride, vinylidene chloride, ethylene dichloride, 1,1,1-tri-chloroethane, 1,1,2-trichloroethane, trichloroethylene, perchloroethylene or mixtures of such chlorinated hydrocarbons.

3. The method of claim 1, wherein the gas stream is an air stream.

4. The method of claim 3 wherein the gas stream contains from 0.0005 to 4 weight percent halogenated hydrocarbon.

5. The method of claim 1 wherein the temperature is from 50° C. to 300° C.

6. The method of claim 1 wherein the cobalt oxide is hydrated cobalt oxide and is selected from the group consisting of cobalt (II) oxide, cobalt (III) oxide and cobalt (II, III) oxide.

7. The method of claim 1 wherein the manganese oxide is manganese (IV) oxide, manganese (III) oxide, manganese (II, III) oxide or mixtures of such oxides of manganese.

8. The method of claim 1 wherein the relative humidity of the combined gas streams contacting the catalyst is less than 5 percent.

9. The method of claim 8 wherein the relative humidity is less than about 2 percent.

10. The method of claim 1 wherein the oxides of cobalt and manganese contain water of hydration in an amount at least as high as that obtained by drying an aqueous filter cake of the respective precipitated metal oxides at 200° C.

11. A method for treating $C_2$-chlorinated hydrocarbon containing air stream, which comprises contacting the chlorinated hydrocarbon with an oxidizing amount of oxygen at temperatures within the range of from 20° C. to 500° C. in the presence of metal oxide catalyst system, the metal oxide catalyst content of which consists essentially of a mixture of hydrated manganese oxide and cobalt oxide, the weight ratio of manganese oxide to cobalt oxide being from 10:1 to 1:10, for a time sufficient to reduce the $C_2$-chlorinated hydrocarbon content of the air stream, said temperature being such as to inhibit water-induced loss of catalyst activity.

12. The method of claim 11 wherein the chlorinated hydrocarbon contains from 2 to 3 chlorine atoms.

13. The method of claim 12 wherein the cobalt oxide is hydrated cobalt oxide.

14. The method of claim 13 wherein the manganese oxide is manganese (IV) oxide, manganese (III) oxide, manganese (II, III) oxide or mixtures of such oxides of manganese and the cobalt oxide is cobalt (II) oxide, cobalt (III) oxide, cobalt (II, III) oxide or mixtures of such oxides of cobalt.

15. The method of claim 14 wherein the relative humidity of the combined gas streams contacting the catalyst is less than 5 percent.

16. The method of claim 14 wherein the temperature is within the range of 20° C.–300° C.

17. A method for reducing the vinyl chloride content of a vinyl chloride-containing gas stream which comprises contacting the vinyl chloride of the gas stream with an oxidizing amount of oxygen-containing gas in the presence of metal oxide catalyst system, the metal oxide catalyst content of which consists essentially of a mixture of hydrated manganese oxide and cobalt oxide, the weight ratio of manganese oxide to cobalt oxide being from 5:1 to 1:5 at temperatures within the range of from 20° C. to 300° C., for a time sufficient to reduce the vinyl chloride content of the gas stream, said temperature being such as to inhibit water induced loss of catalyst activity.

18. The method of claim 17 wherein the cobalt oxide is hydrated cobalt oxide.

19. The method of claim 18 wherein the relative humidity of the combined gas streams contacting the catalyst is less than 5 percent.

20. The method of claim 18 wherein the vinyl chloride-containing gas stream is an air stream and the air stream has a relative humidity of less than 5 percent before contacting the metal oxide catalyst.

21. The method of claim 18 wherein the temperature is within the range of 80° C. to 250°to C.

22. The method of claim 17 wherein the total amount of oxygen-containing gas is at least that amount which is required to oxidize the carbon and hydrogen content of the vinyl chloride to carbon dioxide and water.

23. The method of claim 17 wherein the vinyl chloride content of the gas steam is from 0.001 to 0.1 weight percent.

* * * * *